United States Patent
Ederyd et al.

(10) Patent No.: US 6,602,312 B2
(45) Date of Patent: Aug. 5, 2003

(54) SEAL RINGS FOR POTABLE WATER APPLICATIONS

(75) Inventors: Stefan Ederyd, Saltsjö-Boo (SE); Emmanuel Pauty, Echirolles (FR)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/067,804

(22) Filed: Feb. 8, 2002

(65) Prior Publication Data

US 2002/0152840 A1 Oct. 24, 2002

(30) Foreign Application Priority Data

Feb. 8, 2001 (SE) .............................................. 0100398

(51) Int. Cl.[7] .............................................. C22C 29/08
(52) U.S. Cl. ......................................... 75/240; 75/242
(58) Field of Search .................................... 75/240, 242

(56) References Cited

U.S. PATENT DOCUMENTS

| | | | | |
|---|---|---|---|---|
| 4,265,662 A | * | 5/1981 | Miyake et al. ................. | 75/238 |
| 4,280,841 A | * | 7/1981 | Ito et al. ........................ | 419/14 |
| 4,497,660 A | | 2/1985 | Lindholm | |
| 4,936,912 A | * | 6/1990 | Revankar ...................... | 419/18 |
| 5,802,955 A | * | 9/1998 | Stoll et al. .................... | 92/248 |
| 6,010,283 A | | 1/2000 | Henrich et al. | |
| 6,086,650 A | * | 7/2000 | Carpenter ..................... | 75/240 |
| 6,200,524 B1 | * | 3/2001 | Griskin et al. ................. | 419/18 |

FOREIGN PATENT DOCUMENTS

| | | |
|---|---|---|
| JP | 7-286228 | 10/1995 |
| WO | 80/02569 A | 11/1980 |
| WO | 99/13119 A | 3/1999 |

OTHER PUBLICATIONS

"Suitability of non–metallic products for use in contact with water intended for human consumption with regard to their effect on the quality of water", British Standard BS 6920: Section 2.6: 1996.
Database WPI XP–002220592, Section Ch. Week 199601, Derwent Publications Ltd., London, GB, JP 07 286228, Oct. 31, 1995.

\* cited by examiner

*Primary Examiner*—Ngoclan Mai
(74) *Attorney, Agent, or Firm*—Burns, Doane, Swecker & Mathis, L.L.P.

(57) ABSTRACT

A cemented carbide seal ring has at least one hard phase in a binder phase based on Co, Ni and Fe which results in a content Fe, Ni and Cr of less than 50 $\mu$g/l of each in a leach test with deionized water at 85° C. performed according to the requirements of British Standard BS6920: Section 2.6: 1996.

22 Claims, 1 Drawing Sheet

SEAL RINGS FOR POTABLE WATER APPLICATIONS

FIELD OF THE INVENTION

The present invention relates to cemented carbide seal rings for potable water applications satisfying new demands of Fe, Ni and Cr contents.

BACKGROUND OF THE INVENTION

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

Cemented carbide for corrosion resistance demanding applications such as seal rings, bearings, bushings, hot rolls, etc. generally has a binder phase of Co, Ni, Cr and Mo, where the Cr and/or Mo addition act as corrosion inhibitors. An example of such a cemented carbide is disclosed in U.S. Pat. No. 4,497,660.

U.S. Pat. No. 6,010,283 and related patents disclose a cemented carbide with Co—Ni—Fe binder phase with 40–90 wt. % Co and 4–36 wt. % of each of Fe and Ni.

In cemented carbide seal rings for potable water applications Co and Ni-based binder phase cannot be used because of insufficient corrosion resistance. Instead cemented carbide with binder phase based on Ni and Cr have to be used. In the newly approved British standard BS6920, a cemented carbide to be used in potable water applications must have a content of Fe, Ni and Cr of less than 50 $\mu$g/l of each, as measured in a leach test with deionized water at 85° C. must be fulfilled, which is not possible with presently used cemented carbide seal rings.

SUMMARY OF THE INVENTION

It is therefore an object of the present invention to provide seal rings for potable water applications fulfilling the demands of BS6920.

It has now surprisingly been found that a cemented carbide with a binder phase combining Fe, Ni, Co, Cr and Mo gives significant improvement in corrosion resistance. This cemented carbide material possesses a corrosion resistance on the order of stainless steel when placed in hot water. Thus, the cemented carbide of the present invention is able to satisfy the demands of BS6920. As a result the corrosion resistant cemented carbide can be used in seal rings in potable water applications according to BS6920. Thus a seal ring with the corrosion properties of stainless steel but with the wear resistance of cemented carbide is obtained.

According to the present invention there is now provided cemented carbide seal rings consisting of at least one hard phase in a binder phase based on Co, Ni and Fe fulfilling the requirements of BS6920.

According to one aspect, the present invention provides a corrosion resistant carbide seal ring comprising a hard phase and a binder phase, the ring having a high resistance to leaching such that less than 50 $\mu$g/l of each of Fe, Ni and Cr leaches into deionised water at 85° C. when subjected to the procedure set forth in British Standard BS6920, Section 2.6, 1996.

DETAILED DESCRIPTION OF THE INVENTION

Figure 1:
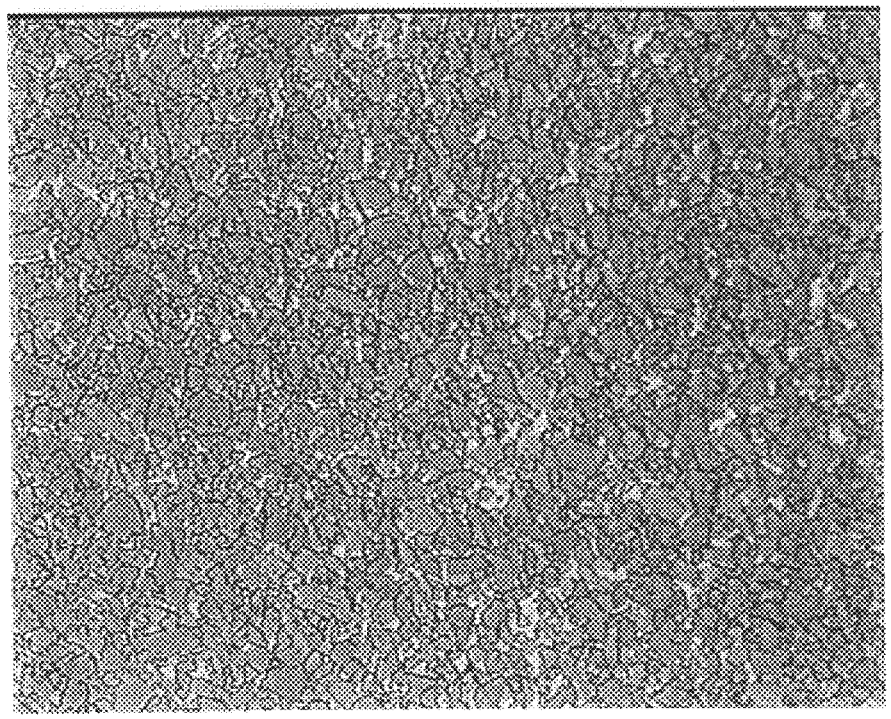
FIG. 1 shows the microstructure in 1500×magnification of a cemented carbide according to the invention.

Cemented carbide seal rings according to the invention should have a content of binder phase from 5 to 15 wt. %, preferably 8 to 11 wt. %, most preferably about 9 wt. %, with the remainder WC with an average grain size of 1.0 $\mu$m to 5 $\mu$m. The binder phase should be based on Fe, Co and Ni with a composition 35–45 wt. % Fe, 15–50 wt. % Co and the remainder Ni. The Fe/Ni ratio should be 1–1.3. Further, the binder phase should preferably contain Cr and possibly Mo, in addition to dissolved W. The following relation for the total Cr content shall be satisfied.

0.05<wt. % Cr/(100-wt. % WC)<0.15, preferably 0.055<wt. % Cr/(100-wt. % WC)<0.11, most preferably about 0.065<wt. % Cr/(100wt. % WC)<0.085.

The amount of Mo shall be 0.1–3 wt. %, preferably <0.5 wt. %. The total carbon content shall be in the interval of 6.13–(0.05±0.007)×binder phase (Co+Ni+Fe) content (wt. %).

A certain graphite porosity on the order of <CO2 can be accepted in the interior of the ring, but in the surface region, where corrosion could occur, the graphite can act as a galvanic element and therefore should be avoided. A surface zone thicker than 200 $\mu$m free of graphite shall therefore be present.

The cemented carbide according to the present invention is made by conventional powder metallurgical methods. Powders forming the hard constituents and prealloyed Ni, Fe and Co powders forming the binder phase are wet milled together, dried, pressed to bodies of desired shape and sintered. The powder mixture shall have such a carbon content to give a carbon content of the sintered bodies according to above specified carbon content interval. For the binder phase contents according to the invention a temperature in excess of 1550° C. is suitable. Cooling from sintering temperature shall be made as quickly as possible generally at a speed in excess of 15° C./min down to 1100° C.

EXAMPLE 1

Cemented carbide for seal rings according to prior art were made with the composition of 91 wt. % WC, 8 wt. % Ni, 0.7 wt. % Cr, 0.3 wt. % Mo. Two types of rings with dimension: OD=40 mm, ID=30 mm, height=5 mm (2200 mm$^2$) and with dimension: OD=39 mm, ID=31 mm, height=3 mm (1540 mm$^2$) respectively, were manufactured for testing.

The rings were sintered at 1520° C. and had a carbon content of 5.64 wt. % after sintering and an average WC grain size of 1.5 $\mu$m.

Seal rings according to the invention were made for testing with the same dimensions as above.

The composition of the cemented carbide according to the invention was:

| | |
|---|---|
| WC: | 91.0 wt. % |
| Fe-Ni-Co alloy: | 8.0 wt. % |
| Mo: | 0.3 wt. % |
| Cr: | 0.7 wt. % |

The composition of the used FeNiCo-binder alloy was:

| | |
|---|---|
| Fe: | 40.5 wt. % |
| Ni: | Remainder |
| Co | 21.1 wt. % |
| Total C | 0.014 wt. % |
| Total O | 0.61 wt. % |

The grain size of the WC phase was 1.5 $\mu$m. The rings were sintered at 1520° C. in vacuum for 1 hour.

The physical properties after sintering were as follow:

| | |
|---|---|
| Density | 14.54 g/cm$^3$ |
| Hardness | 1200 HV3 |
| Porosity | A00B00C00 |

The carbon balance was close to eta-phase formation. A good milling and wetting behaviour was observed.

EXAMPLE 2

A corrosion test according to BS6920 was performed with rings used in seal ring applications. The test comprised essentially the following steps:

1. Cleaning of the container with HNO$_3$(10 vol. %) and deionised water.
2. Cleaning of the sample with tap water (30 min) and rinse three times with deionised water.
3. Immersion of the sample at room temperature during one day in 500 ml of deionised water.

The rings are placed on PTFE supports (previously washed as in point 1) in order to maintain the rings vertically.

The test is done at room temperature and at 85° C.

4. Transfer of all but 50 ml of the extract into a sample bottle (cleaned as in point 1).

Add 5 ml of HNO$_3$ (70 wt. %) to the remaining 50 ml in order to remove any metals adsorbed onto the surface of the container.

Add to the rest of the extract.

5. Chemical determination of Co, Ni, Cr, Mo and Fe using ICP-spectrometry.
6. Reimmersion of the sample at room temperature in new deionised water six times: five times for one day and once for three days following points 1, 2, 4 and 5.
7. Blank test: following the point 1 to 5 without any sample.

Test material were rings with two dimensions:

OD=39 mm, ID=31 mm, height=3 mm (1540 mm$^2$)
OD=40mm, ID=30 mm, height=5 mm (2200 mm$^2$)

The surface condition was as sintered.

Materials Used in the Corrosion Test:

Stainless steel AISI 316 (Fe: Cr18/Ni10/Mo3). Plates of steel with about 9000 mm$^2$ total surface were used instead of rings in the leaching test with water.

Grade C6N with 0.55 wt. % Cr

Rings with the total area of about 15000 mm$^2$ were used during the leaching procedure.

This grade is a common used CC-grade in seal rings for pumps in salt and fresh water.

Grade C9M (9 wt. % of a Ni—Mo—Cr Binder) According to Prior Art (Example 1)

Rings with the total area of about 15000 mm$^2$ were used during the leaching procedure.

This grade is used in pumps for corrosive media especially seawater.

Rings According to the Invention (Example 1)

Rings with the total area of about 15000 mm$^2$ were used during the leaching procedure.

Results:

| Analysis, $\mu$g/l | Leaching No 1 | 7 |
|---|---|---|
| Stainless steel AISI 316 | | |
| Temp. 26° C. | | |
| Co | 220 | <20 |
| Ni | 20 | <20 |
| Fe | 150 | <20 |
| Cr | <20 | <20 |
| Mo | <20 | <20 |
| Temp. 85° C. | | |
| Co | 60 | <20 |
| Ni | 2320 | <20 |
| Fe | 460 | <20 |
| Cr | <20 | <20 |
| Mo | <20 | <20 |
| Grade C6N +0.55 wt. % Cr | | |
| Temp. 85° C. | | |
| Co | 480 | <25 |
| Ni | 6000 | 210 |
| Grade C9M (Prior art, Example 1) | | |
| Temp. 85° C. | | |
| Co | 170 | 40 |
| Ni | 2920 | 570 |
| Cr | <20 | <20 |
| Mo | <20 | <20 |
| Fe | 370 | <20 |
| According to the invention (Example 1) | | |
| Temp. 24° C. | | |
| Co | 20 | <20 |
| Ni | 40 | <20 |
| Temp. 85° C. | | |
| Co | 180 | <20 |
| Ni | 360 | <20 |

These results show very good corrosion resistance for the cemented carbide according to the invention:

At room temperature, the Co and Ni concentrations are lower to the limit of 50 $\mu$g/l or lower to the detection limit of 20 $\mu$g/l after the first and last leaching respectively.

At higher temperature, the Co and Ni concentrations are quite high after the first leaching, but below the detection limit after the last leaching.

The cemented carbide can be approved under the BS6920 standard.

EXAMPLE 3

The resistance to abrasive wear was investigated with a crater grinding test as follows.

The test equipment consists of a stainless steel wheel with a diameter and width of 20 and 2 mm, respectively. The wheel has a rounded rim surface with the same radius as the wheel, thus shaped as if cut out from the centre of a sphere. The specimens were glued to a horizontal table, which was also rotated during the test. Abrasive slurries were applied between wheel and specimen surface. The combined rotary motion resulted in a wear scar the shape of a spherical cap, some 1 mm in diameter, on the specimen surface.

The abrasive wear particles are monocrystalline diamond of a grit size of 2.5 µm. These particles are mixed with a commercial standard liquid (KEMET TYPE 0), to a concentration of 25 g/l. The normal load was 0.2 N and the total sliding distance was 50 meter (800 revolutions). After every 12.5 m the test was stopped, the crater diameter measured with optical microscopy and new slurry deposited on the specimen. The volume loss was measured with an optical surface profilometer.

The cemented carbide rings from example 1 were tested according to mentioned test method:

Results from the small scale abrasion wear test:

| Specimen | Relative wear |
|---|---|
| Grade SANDVIK C10C | 1.00 |
| Grade C9M (prior art, Example 1) | 0.87 |
| According to the invention | 0.93 |
| Stainless steel AISI 316 | 8.3 |

The relative wear is less for the cemented carbide according to the invention. Thus, the new grade has both better corrosion resistance and better wear resistance than the grade C9M.

While the present invention has been described by reference to the above-mentioned embodiments, certain modifications and variations will be evident to those of ordinary skill in the art. Therefore, the present invention is limited only by the scope and spirit of the appended claims.

We claim:

1. A corrosion resistant seal ring comprising a hard phase and a binder phase, the ring having a composition comprising Fe, Ni and Cr such that a high resistance to leaching is provided such that less than 50 µg/l of each of Fe, Ni and Cr leaches into deionised water at 85° C. when subjected to the procedure set forth in British Standard BS6920, Section 2.6, 1996.

2. The seal ring according to claim 1, wherein the ring has content of binder phase of 5–15 wt. %, with the remainder WC with an average grain size of 1 µm to 5 µm, and the binder phase has a composition comprising 35–45 wt. % Fe, 15–50 wt. % Co and remainder Ni.

3. The seal ring according to claim 2, wherein the content of binder phase is 8–11 wt. %.

4. The seal ring according to claim 2, wherein the content of binder phase is about 9 wt. %.

5. The seal ring according to claim 2, wherein the binder phase has a Fe/Ni ratio of 1–1.3.

6. The seal ring according to claim 5, wherein the binder phase contains Cr.

7. The seal ring according to claim 6, wherein the binder phase contains Cr in an amount of 0.05<wt. % Cr/(100-wt. % WC)<0.15.

8. The seal ring according to claim 7, wherein the Cr amount is 0.055<wt. % Cr/(100-wt. % WC)<0.11.

9. The seal ring according to claim 7, wherein the Cr amount is 0.065<wt. % Cr/(100-wt. % WC)<0.085.

10. The seal ring according to claim 5, wherein the binder phase contains Mo.

11. The seal ring according to claim 6, wherein the binder phase contains Mo in an amount of 0.1–3 wt. %.

12. The seal ring according to claim 11, wherein the binder phase contains Mo in an amount of <0.5 wt. %.

13. The seal ring according to claim 1, where the ring comprises a total carbon content in the interval of 6.13–(0.05±0.007)×binder phase (Co+Ni+Fe) content (wt. %).

14. The seal ring according to claim 1, wherein the ring has a graphite porosity<$CO_2$ in the interior of the ring.

15. The seal ring according to claim 14, wherein the ring has a surface zone>200 µm thick which is free of graphite porosity.

16. A seal ring formed at least in part from a material comprising a hard phase and a binder phase, the binder phase comprising 35–45 wt. % Fe.

17. The seal ring of claim 16, wherein the binder phase further comprises 15–50 wt. % Co and remainder Ni.

18. The seal ring of claim 17, wherein the hard phase comprises WC.

19. The seal ring of claim 18, wherein the seal ring has a binder phase content of 5–15 wt. %.

20. The seal ring of claim 19, wherein the binder phase has a Fe/Ni ratio of 1–1.3.

21. The seal ring of claim 20, wherein the binder phase further comprises Cr and Mo.

22. The seal ring of claim 21, wherein the ring has a surface zone>200 µm thick which is free of graphite porosity.

* * * * *